United States Patent
Allen

(10) Patent No.: US 9,110,525 B2
(45) Date of Patent: Aug. 18, 2015

(54) TOUCH-SENSITIVE DISPLAY AND METHOD

(75) Inventor: Aaron Robert Allen, Pembroke Pines, FL (US)

(73) Assignee: BLACKBERRY LIMITED, Waterloo (CA)

( * ) Notice: Subject to any disclaimer, the term of this patent is extended or adjusted under 35 U.S.C. 154(b) by 138 days.

(21) Appl. No.: 13/536,241

(22) Filed: Jun. 28, 2012

(65) Prior Publication Data

US 2014/0002371 A1    Jan. 2, 2014

(51) Int. Cl.
*G06F 3/041* (2006.01)

(52) U.S. Cl.
CPC ........... *G06F 3/041* (2013.01); *B32B 2457/208* (2013.01); *G06F 3/0412* (2013.01); *G06F 2203/04102* (2013.01); *G06F 2203/04103* (2013.01)

(58) Field of Classification Search
CPC ................. G06F 3/041; G06F 3/0412; G06F 2203/04102; G06F 2203/04103
USPC .......... 345/173–178; 178/18.01, 18.03–18.09
See application file for complete search history.

(56) References Cited

U.S. PATENT DOCUMENTS

| | | | | |
|---|---|---|---|---|
| 5,771,039 A | * | 6/1998 | Ditzik | ............................ 345/178 |
| 5,966,108 A | * | 10/1999 | Ditzik | ............................ 345/75.2 |
| 6,380,497 B1 | * | 4/2002 | Hashimoto et al. | ........... 200/5 A |
| 6,841,225 B2 | * | 1/2005 | Bottari | ........................... 428/192 |
| 8,614,666 B2 | * | 12/2013 | Whitman et al. | ............. 345/156 |
| 8,675,147 B2 | * | 3/2014 | Murakami | ...................... 349/12 |
| 8,773,848 B2 | * | 7/2014 | Russell-Clarke et al. | ........................ 361/679.21 |
| 2003/0067449 A1 | | 4/2003 | Yoshikawa et al. | |
| 2010/0066702 A1 | | 3/2010 | Lee et al. | |
| 2011/0183118 A1 | | 7/2011 | Lamberson et al. | |
| 2011/0236597 A1 | * | 9/2011 | Chan | .............................. 427/555 |
| 2011/0242017 A1 | | 10/2011 | Kang et al. | |
| 2011/0285640 A1 | | 11/2011 | Park et al. | |
| 2011/0316808 A1 | * | 12/2011 | Hsieh | ............................. 345/174 |
| 2013/0188366 A1 | * | 7/2013 | Russell-Clarke et al. | .... 362/362 |

OTHER PUBLICATIONS

International Search Report and Written Opinion mailed Feb. 27, 2013, for corresponding application No. PCT/US2012/044637, pp. 10.

* cited by examiner

*Primary Examiner* — Jason Mandeville

(74) *Attorney, Agent, or Firm* — Geoffrey deKleine; Borden Ladner Gervais LLP

(57) ABSTRACT

A touch-sensitive apparatus includes a first material, a second material joined to the first material such that the first material and the second material are substantially flat across an interface between the first material and the second material, and first touch sensors disposed continuously across the interface from the first material to the second material.

14 Claims, 3 Drawing Sheets

TOUCH-SENSITIVE DISPLAY AND METHOD

FIELD OF TECHNOLOGY

The present disclosure relates to electronic devices including, but not limited to, portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones (smart phones), Personal Digital Assistants (PDAs), tablet computers, and laptop computers, with wireless network communications or near-field communications connectivity such as Bluetooth® capabilities.

Portable electronic devices such as PDAs, or tablet computers are generally intended for handheld use and ease of portability. Smaller devices are generally desirable for portability. A touch-sensitive display, also known as a touch-screen display, is particularly useful on handheld devices, which are small and may have limited space for user input and output. The information displayed on the display may be modified depending on the functions and operations being performed.

Improvements in electronic devices with touch-sensitive displays are desirable.

DETAILED DESCRIPTION

Figure 1:
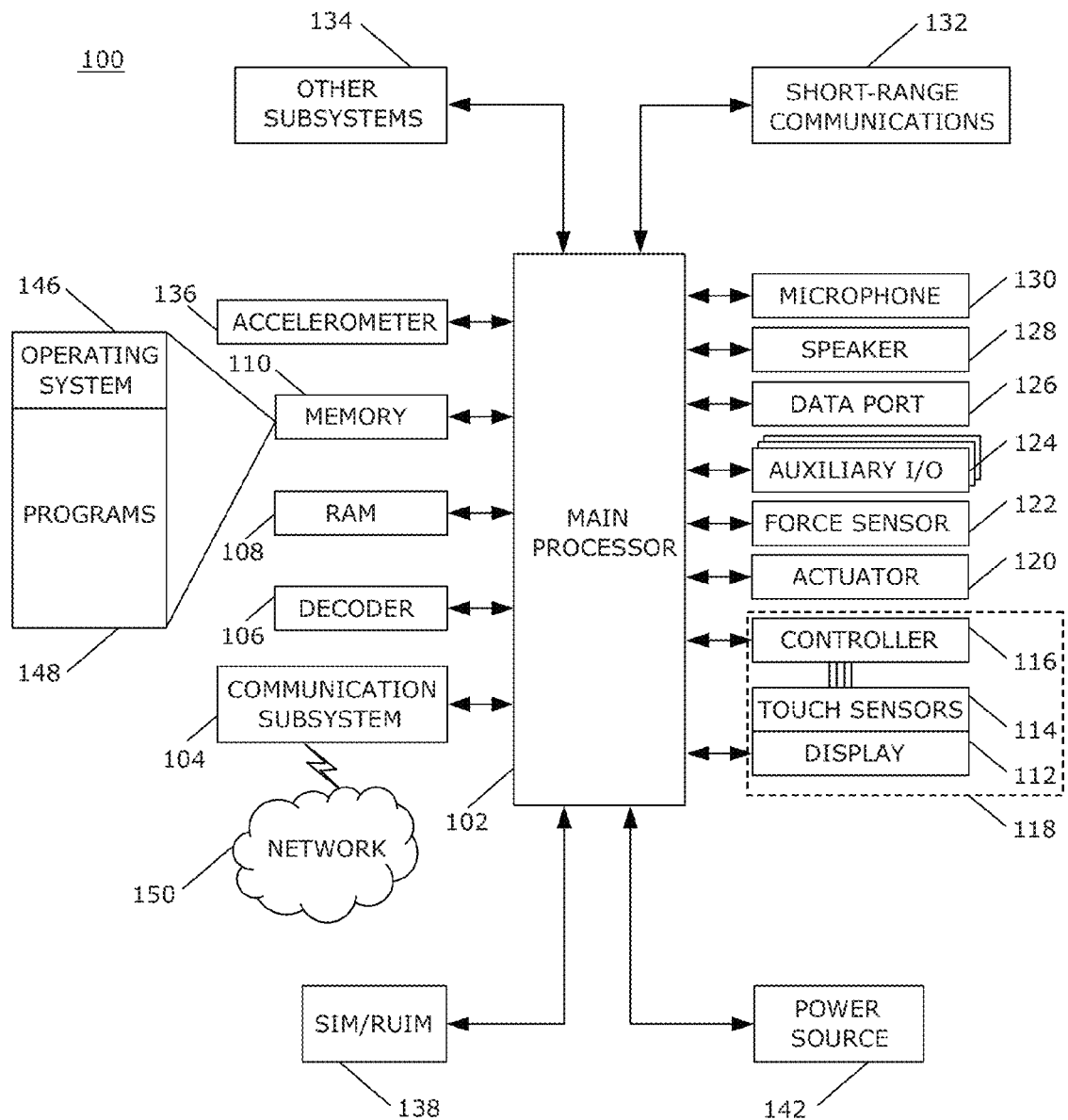
FIG. 1 is a block diagram of a portable electronic device in accordance with the disclosure.

The following describes a touch-sensitive apparatus that includes a first material, a second material joined to the first material such that the first material and the second material are substantially flat at an interface between the first material and the second material, and first touch sensors disposed continuously across the interface from the first material to the second material.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device as described herein. Examples of electronic devices include mobile, or handheld, wireless communication devices such as pagers, cellular phones, cellular smart-phones, wireless organizers, personal digital assistants, wirelessly enabled notebook computers, tablet computers, mobile internet devices, electronic navigation devices, and so forth. The electronic device may be a portable electronic device without wireless communication capabilities, such as a handheld electronic game, digital photograph album, digital camera, media player, e-book reader, and so forth.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as a Random Access Memory (RAM) 108, memory 110, a touch-sensitive display 118, one or more actuators 120, one or more force sensors 122, an auxiliary input/output (I/O) subsystem 124, a data port 126, a speaker 128, a microphone 130, short-range communications 132 and other device subsystems 134. The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the portable electronic device 100 may utilize a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs, applications, or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be a capacitive touch-sensitive display that includes one or more capacitive touch sensors 114. The capacitive touch sensors may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus (active or passive), pen, or other pointer, depending on the nature of the touch-sensitive display 118. Multiple simultaneous touches may be detected.

One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The optional actuator(s) 120 may be depressed or activated by applying sufficient force to the touch-sensitive display 118 to overcome the actuation force of the actuator 120. The actuator(s) 120 may be actuated by pressing anywhere on the touch-sensitive display 118. The actuator(s) 120 may provide input to the processor 102 when actuated. Actuation of the actuator(s) 120 may result in provision of tactile feedback. When force is applied, the touch-sensitive display 118 is depressible, pivotable, and/or movable. Such a force may actuate the actuator(s) 120. The touch-sensitive display 118 may, for example, float with respect to the housing of the portable electronic device, i.e., the touch-sensitive display 118 may not be fastened to the housing. A mechanical dome switch actuator may be utilized. In this example, tactile feedback is provided when the dome collapses due to imparted force and when the dome returns to the rest position after release of the switch. Alternatively, the actuator 120 may comprise one or more piezoelectric (piezo) devices that provide tactile feedback for the touch-sensitive display 118.

Optional force sensors 122 may be disposed in conjunction with the touch-sensitive display 118 to determine or react to forces applied to the touch-sensitive display 118. The force sensor 122 may be disposed in line with a piezo actuator 120. The force sensors 122 may be force-sensitive resistors, strain gauges, piezoelectric or piezoresistive devices, pressure sensors, quantum tunneling composites, force-sensitive switches, or other suitable devices. Force as utilized throughout the specification, including the claims, refers to force measurements, estimates, and/or calculations, such as pressure, deformation, stress, strain, force density, force-area relationships, thrust, torque, and other effects that include force or related quantities. Optionally, force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

Figure 2:
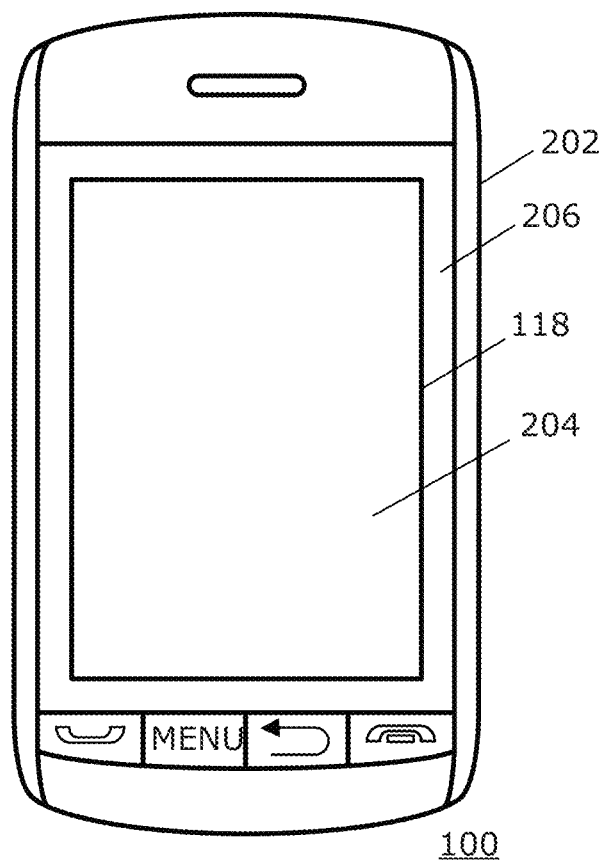
FIG. 2 is a front view of a portable electronic device in accordance with the disclosure.

A front view of an example of the electronic device 100 is shown in FIG. 2. The electronic device 100 includes the touch-sensitive display 118. A housing 202 and the touch-sensitive display 118 enclose components such as the components shown in FIG. 1.

The touch-sensitive display 118 includes a display area 204 in which information may be displayed, and a non-display area 206 extending around the periphery of the display area 204. The display area 204 of the touch-sensitive display 118 may be generally centered in the housing 202. The non-display area 206 extends around the periphery of the display area 204. The display area 204 generally corresponds to the area of the display 112. Information is not displayed in the non-display area 206 by the display, which non-display area 206 is utilized to accommodate, for example, electronic traces or electrical connections, adhesives or other sealants, and/or protective coatings around the edges of the display area 204. The non-display area 206 may be referred to as an inactive area and is not part of the physical housing or frame of the electronic device. Typically, no pixels of the display are in the non-display area 206, thus no image can be displayed by the display 112 in the non-display area 206. Optionally, a secondary display, not part of the primary display 112, may be disposed under the non-display area 206. Touch sensors are disposed in the non-display area 206, which touch sensors may be extended from the touch sensors 114 in the display area 204. A touch, including a gesture, may be associated with the display area 204, the non-display area 206, or both areas. The touch sensors 114 may extend across substantially the entire non-display area 206 or may be disposed in only part of the non-display area 206.

In known devices, an opaque ink may be printed around the outer periphery of the cover of the touch-sensitive display 118. The opaque ink may be any suitable color and may, for example, match the color of the housing 202. The opaque ink may be utilized to cover components such as the electronic traces, electrical connections, adhesives or other sealants in the non-display area 206 around the edges of the display area 204. A step is formed on the underside, or the side disposed closest to the display 112, of the cover by the ink that is printed on the cover. The step is located at the interface between the display area 204 and the non-display area 202. The color of the ink affects the thickness of the printed ink, and thus the size of the step. For example, black ink is approximately 8 μm thick and white ink is approximately 20 μm thick. Because the touch sensors and traces may be made of brittle material such as ITO, the touch sensors and traces that are printed onto the underside of the cover are prone to cracking or breaking if the step on the underside of the cover is too large, e.g., when the printed ink is too thick, such as a step greater than 4 μm.

Figure 3:
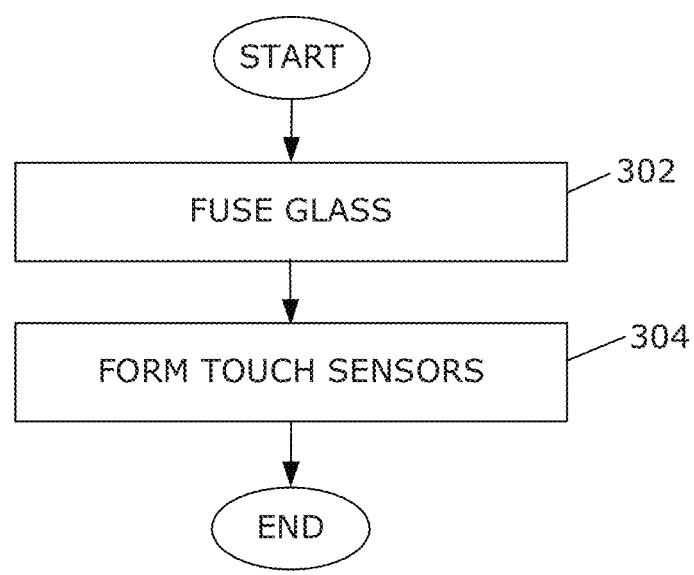
FIG. 3 is a flowchart illustrating an example of a method of manufacturing a cover of a touch-sensitive display in accordance with the disclosure.

A flowchart illustrating an example of a method of manufacturing a cover of the portable electronic device 100 is shown in FIG. 3. A first material is joined 302 to a second material. The first material may be, for example, an optically clear, translucent, or transparent glass that is utilized to cover the display area 204 of the touch-sensitive display 118. The second material may be a colored glass, such as black glass, that is sized to extend around the periphery of the first glass, for example, to cover the non-display area 206. The first material and the second material may be joined or fused such that the underside of the first material and the second material is substantially flat or planar, including across the interface. The thicknesses of the first material and the second material are substantially the same and a lip or step is not present between the first material and the second material, or the lip or step is nominal or small such that touch sensors formed on the underside of the cover are not prone to cracking or breaking due to the step. For example, a step less than 4 μm thick is more likely to resist cracking than a step 6 μm thick or larger. The step may be, for example, less than 4 μm. Optionally, the step may be less than 3 microns. Optionally, the step may be less than 2 microns. Optionally, the step may be less than 1 micron. The size of the step may be reduced based on the joining or fusing process and any post-processing. The first material and the second material may be fused together by, for example, partially melting the first material and the second material and joining the two. Alternatively, the first material may be partially melted, barely or nearly solid, or solid and placed, for example, in a mold. A molten or melted second material may be added to fill the mold. The fusing may be controlled to minimize the area comprising both materials in a fused or combined state. Any step or lip at the interface between the first material and the second material may be removed, for example, by fine grinding.

Touch sensors are formed 304 on the underside of the first material and the second material such that the touch sensors extend continuously across the interface from the first material to the second material. The touch sensors may be formed, for example, by depositing conductive material, such as ITO, on the underside of the first material and the second material, followed by, for example, laser patterning of the conductive material.

Figure 4:
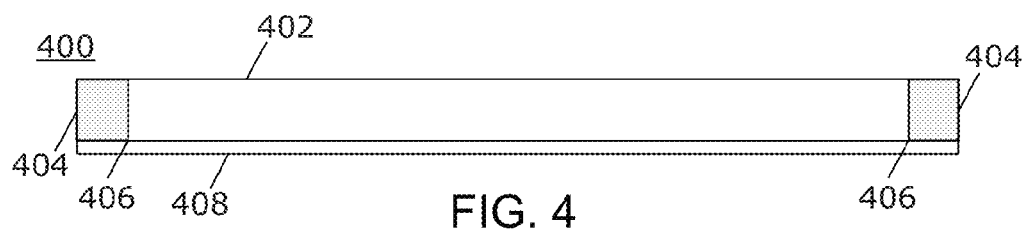
FIG. 4 and FIG. 5 are cross sections of a cover of a touch-sensitive display in accordance with the disclosure.
Figure 5:
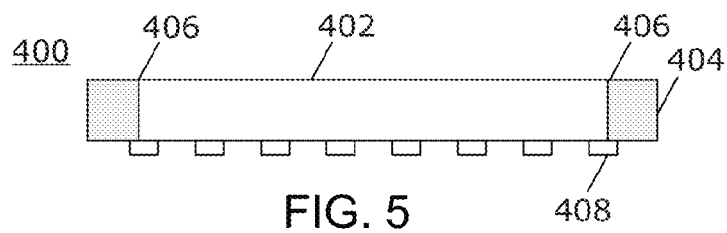

Cross sections of a cover 400 of the touch-sensitive display 118 are shown in FIG. 4, which is a lengthwise cross section, and FIG. 5, which is a widthwise cross section. The first material 402, which, in the example of FIG. 4 and FIG. 5, is generally rectangular and is sized to cover the display area 204 of the touch-sensitive display 118. A second material 404, which, in the example of FIG. 4 and FIG. 5, extends around the first material, along the outer periphery of the first material 402. The thickness of the second material 404 is substantially the same as the thickness of the first material 402. The second material 404 is fused to the first material 402. The first material 402 and the second material 404 are substantially flat at their interface 406. The underside of the fused cover 400 is substantially planar as described above. The top or outermost side of the fused cover 400 is also substantially planar across the interface of the first material and the second material, and may be formed in a similar way as the underside is formed and/or further processed.

The touch sensors 408, which may be, for example, sense lines, are disposed on the planar underside of the cover 400. The touch sensors 408 extend continuously across the interface 406 from the first material 402, e.g., optically clear glass, to the second material 404, e.g., the colored glass.

Figure 6:
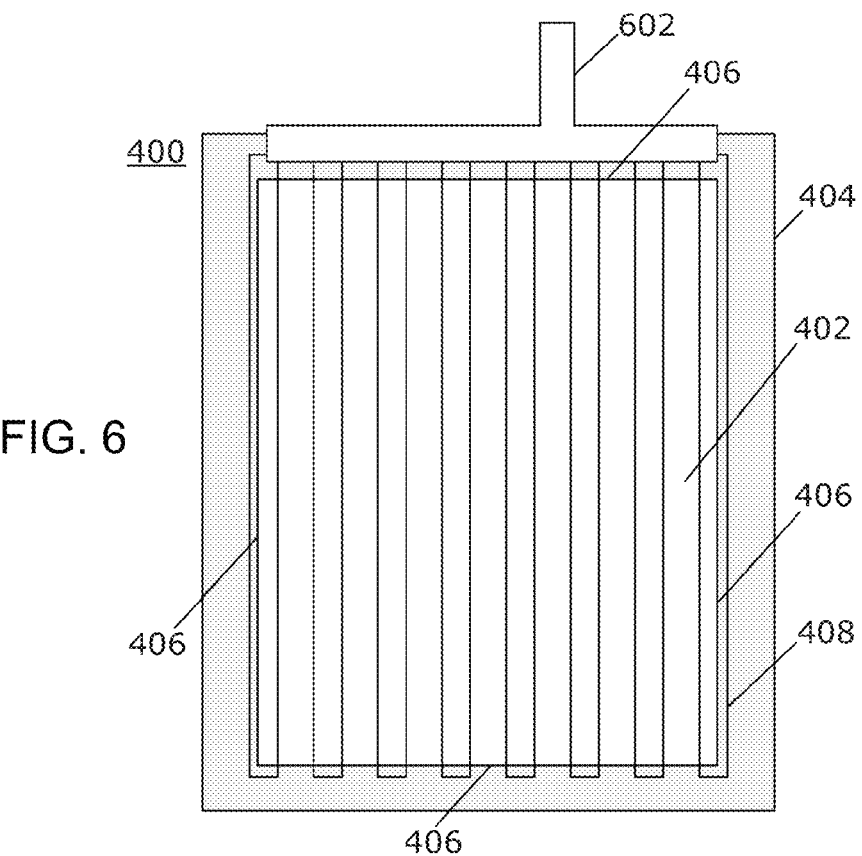
FIG. 6 is a bottom view of a cover of a touch-sensitive display in accordance with the disclosure.

An underside or bottom view of the cover of the touch-sensitive display is illustrated in FIG. 6. A flex connector 602 is coupled to the touch sensors 408 and is utilized to couple the touch sensors 408 to the controller 116.

Figure 7:
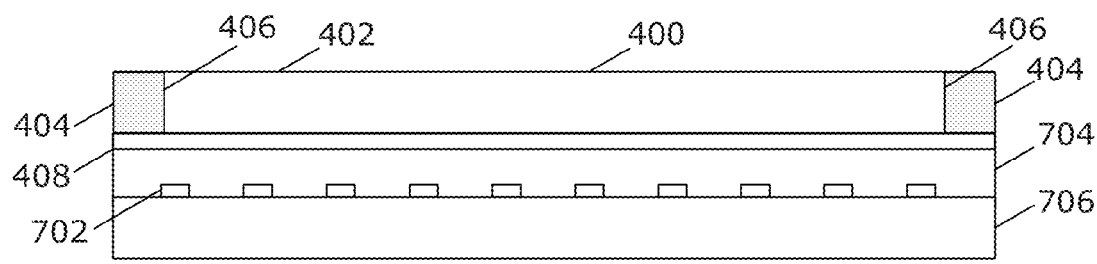
FIG. 7 is a cross section of a touch-sensitive display including a cover in accordance with the disclosure.

A cross section the touch-sensitive display 118 including the cover 400 is illustrated in FIG. 7. The touch sensors 408 are disposed on the planar underside of the joined or fused first material 402 and second material 404. Scanning touch sensors 702 are disposed on a substrate 706 and are spaced from the touch sensors 408 by a dielectric material 704 disposed between the touch sensors 408 and the scanning touch sensors 702. The touch sensors 408 and the touch sensors 702 are coupled to the controller 116 utilizing, for example, one or more flex connectors 602, to facilitate detection of touches, for example, on the cover 400.

Although two pieces of glass are fused together in the above examples, more than two pieces of glass may be fused together. Colored glass may also be fused to colored glass to provide artwork or other displayed features in the cover. The terms "underside" and "top side" are utilized for reference only and are not otherwise limiting.

The cover that is manufactured by fusing two materials together, such as an optically clear glass and a colored glass, is substantially flat or planar. Without a step or lip at the interface between the two materials, touch sensors or traces that are deposited on the underside of the cover, are less susceptible to cracking or breaking. Many different colors of glass may be utilized and may be fused as illustrated in the FIG. 4 through FIG. 7. Alternatively, colored glass may be fused in a pattern to include artwork or other displayed features on the cover.

A touch-sensitive apparatus includes a first material, a second material joined to the first material such that the first material and the second material are substantially flat at an interface between the first material and the second material, and first touch sensors disposed continuously across the interface from the first material to the second material. A touch-sensitive apparatus includes a first material disposed in a first plane, a second material disposed in the first plane and disposed along the outer perimeter of the first material such that the first material and the second material are substantially flat at an interface between the first material and the second material, and a touch sensor disposed continuously from the first material to the second material at the interface. A method includes joining a first material to a second material such that the first material and the second material are substantially flat at an interface between the first material and the second material, and forming touch sensors on the first material and the second material such that the touch sensors are disposed continuously across the interface from the first material to the second material.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A touch-sensitive apparatus comprising:
   a first glass of a first color;
   a second glass of a second color, which second glass is different from the first glass, is substantially the same thickness as the first glass, and is fused to the first glass along a periphery of the first glass such that the first glass and the second glass are substantially co-planar and substantially flat across an interface at which the first glass is fused to the second glass; and
   first touch sensors deposited on the fused first glass and second glass such that a plurality of the first touch sensors are formed continuously across the interface at which the first glass is fused to the second glass, from the first glass of the first color to the second glass of the second color, wherein each first touch sensor of the plurality of the first touch sensors is disposed on the first glass, the interface at which the first glass is fused to the second glass, and the second glass such that each first touch sensor of the plurality of first touch sensors extends continuously from the first glass to the second glass;
   wherein the first color is different than the second color.

2. The touch-sensitive apparatus according to claim 1, comprising a flex connector coupled to the first touch sensors.

3. The touch-sensitive apparatus according to claim 1, comprising a controller coupled to the first touch sensors via a flex connector.

4. The touch-sensitive apparatus according to claim 1, comprising second touch sensors and a dielectric material disposed between first touch sensors and the second touch sensors.

5. A method comprising:
   joining a first glass of a first color to a second-glass of a second color, which second glass is different from the first glass and is substantially the same thickness as the first glass, by fusing the first glass to the second glass such that the first glass and the second glass are substantially co-planar and substantially flat across an interface at which the first glass is fused to the second glass; and
   after fusing the first glass to the second glass, depositing touch sensors on both the first glass and the second glass such that a plurality of the touch sensors are formed continuously across the interface at which the first glass is fused to the second glass, from the first glass of a first color to the second glass of the second color, wherein each touch sensor of the plurality of the touch sensors is disposed on the first glass, the interface at which the first glass is fused to the second glass, and the second glass such that each touch sensor of the plurality of touch sensors extends continuously from the first glass to the second glass;
   wherein the first color is different than the second color.

6. The method according to claim 5, wherein depositing touch sensors comprises depositing a plurality of first touch sensors on both the first glass and the second glass such that the touch sensors are disposed continuously across the interface at which the first glass is fused to the second glass, disposing a dielectric material on the first touch sensors, and depositing second touch sensors on the dielectric material.

7. The method according to claim 6, comprising coupling a flex connector to the first touch sensors and the second touch sensors.

8. The method according to claim 7, comprising coupling the flex connector to a controller to couple the first touch sensors and the second touch sensors to the controller.

9. An electronic device comprising a touch-sensitive apparatus, the touch-sensitive apparatus comprising:
   a first glass of a first color;
   a second glass of a second color, which second glass is different from the first glass, is substantially the same thickness as the first glass, and is fused to the first glass along a periphery of the first glass such that the first glass and the second glass are substantially co-planar and substantially flat across an interface at which the first glass is fused to the second glass;
   first touch sensors deposited on the fused first glass and second glass such that a plurality of the first touch sensors are formed continuously across the interface at which the first glass is fused to the second glass, from the first glass of the first color to the second glass of the second color, wherein each first touch sensor of the plurality of the first touch sensors is disposed on the first glass, the interface at which the first glass is fused to the second glass, and the second glass such that each first touch sensor of the plurality of first touch sensors extends continuously from the first glass to the second glass;
   wherein the first color is different than the second color.

10. The electronic device according to claim 9, comprising a flex connector coupled to the first touch sensors.

11. The electronic device according to claim 9, comprising a controller coupled to the first touch sensors via a flex connector.

12. The electronic device according to claim 9, comprising second touch sensors and a dielectric material disposed between first touch sensors and the second touch sensors.

13. The touch-sensitive apparatus according to claim 1, wherein a first thickness of the first glass is within 4 μm of a second thickness of the second glass.

14. The method according to claim 5, wherein a first thickness of the first glass is within 4 μm of a second thickness of the second glass.

* * * * *